(12) United States Patent  
Wang et al.

(10) Patent No.: US 7,420,289 B2  
(45) Date of Patent: Sep. 2, 2008

(54) METHOD FOR PREDICTING A POWER CURVE FOR A WIND TURBINE

(75) Inventors: Dong Wang, Shanghai (CN); Yu Zhou, Beijing (CN)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 11/567,264

(22) Filed: Dec. 6, 2006

(65) Prior Publication Data

US 2008/0140263 A1 Jun. 12, 2008

(51) Int. Cl.
F03D 9/00 (2006.01)
H02P 9/04 (2006.01)

(52) U.S. Cl. .................................... 290/44; 290/55
(58) Field of Classification Search .............. 290/43, 290/44, 54, 55; 415/1, 30
See application file for complete search history.

(56) References Cited

U.S. PATENT DOCUMENTS

| | | | |
|---|---|---|---|
| 5,155,375 A * | 10/1992 | Holley | 290/44 |
| 6,137,187 A * | 10/2000 | Mikhail et al. | 290/44 |
| 6,840,734 B2 * | 1/2005 | Hansen | 415/1 |
| 6,850,821 B2 * | 2/2005 | Weitkamp | 700/286 |
| 7,023,105 B2 * | 4/2006 | Wobben | 290/44 |
| 7,101,152 B2 * | 9/2006 | Wobben | 416/1 |
| 7,304,400 B2 * | 12/2007 | Kang et al. | 290/44 |
| 7,308,361 B2 * | 12/2007 | Enis et al. | 702/2 |
| 7,317,260 B2 * | 1/2008 | Wilson | 290/44 |
| 7,352,075 B2 * | 4/2008 | Willey et al. | 290/44 |

* cited by examiner

*Primary Examiner*—Nicholas Ponomarenko
(74) *Attorney, Agent, or Firm*—Global Patent Operation

(57) ABSTRACT

A method for calculating a high-altitude power curve for a wind turbine is provided, the method including the steps of determining a $c_p$-$\lambda$ curve for a predetermined blade pitch angle of said wind turbine; calculating a first power curve without power limit based on the $c_p$-$\lambda$ curve; and calculating the high-altitude power curve with power limit from said first power curve, thereby using a site air density.

20 Claims, 8 Drawing Sheets

101 Determine cp-λ curve for wind turbine

102 Calculate power curve using cp-λ curve

101 Determine cp-λ curve for wind turbine

102 Calculate power curve using cp-λ curve

Fig. 1

201 Determine fixed pitch angle θ

202 Determine cp-λ curve for fixed θ

203 Calculate power curve without power limit using cp-λ curve

204 Calculate power curve with power limit using site air density

METHOD FOR PREDICTING A POWER CURVE FOR A WIND TURBINE

BACKGROUND OF THE INVENTION

The present invention relates to a method for predicting a power curve for a wind turbine, especially to a method for obtaining a power curve adapted for high altitude operation of a wind turbine. Furthermore, the present invention is directed to a control strategy utilizing such power curve and to a wind turbine in which such control strategy is implemented.

Wind turbines capture kinetic energy from the wind and convert it into electrical power. Since wind turbines can be designed as stand-alone or island solutions, they are especially suited to supply electric power to remote areas. For example, such areas may be located in mountainous regions or elevated plains, i.e. at high altitude. Due to their elevated location, wind turbines installed at those sites encounter a lower air density compared to sea level. The lower air density causes significant deviations from the "normal" operation at sea level. In particular, the power curve of the wind turbines is different for operation in high altitude. Since the power curve is used to predict the annual power output of the turbines, the power curve deviation may adversely affect the quality of power output predictions. Also, the power curve is used as a basis for the control strategy implemented in the turbine controller. Accordingly, turbine control will not be optimal if the implemented power curve does not correctly reflect the actual behavior of the turbine.

For the above reasons, a power curve correction for high altitudes was developed which is known to those skilled in the art as the IEC 61400-12 standard for air density normalization. The IEC standard describes a method how the sea level power curve of a pitch-regulated wind turbine can be corrected for lower air density at high-altitude sites. However, it turned out overtime that still the power curves corrected according to standard IEC 61400-12, edition 1998, do not correctly reflect the turbine behavior and, typically, overrate the power production in the partial load operation range of the wind turbine.

BRIEF DESCRIPTION OF THE INVENTION

In view of the above, a method for obtaining a power curve for a wind turbine is provided. The method includes the steps of determining a relation between the power coefficient $c_p$ and the tip-speed ratio $\lambda$ for said wind turbine, and using the relation between power coefficient $c_p$ and the tip-speed ratio $\lambda$ to determine a relation between the electrical power output P and wind speed v to obtain the power curve.

Further aspects, advantages and features of the present invention are apparent from the dependent claims, the description and the accompanying drawings.

According to a first aspect of the invention, a method for obtaining a power curve for a wind turbine is provided. In the method according to the first aspect a dependency of the power coefficient on the tip-speed ratio for said wind turbine is identified. The identified dependency of the power coefficient is then used to calculate a relation between the electrical power output and wind speed to obtain the power curve for said wind turbine.

In the method according to the first aspect of the invention, the variation of the power coefficient depending on a change of the tip speed ratio is taken into consideration. Thus, the assumption of a constant power coefficient is abandoned and the power curve of the wind turbine is calculated on the basis of a varying power coefficient. As a result, the power curve obtained by the above-described method reflects the actual power curve measured in the field much better than a corrected power curve obtained according to the IEC 61400-12 standard. Thus, the quality of annual power output predictions as well as turbine control can be considerably improved.

According to another aspect of the present invention, a method for calculating a high-altitude power curve for a wind turbine is provided. The method according to the other aspect of the invention includes the steps of determining a $c_p$-$\lambda$ curve for a predetermined blade pitch angle of said wind turbine; calculating a first power curve without power limit based on the $c_p$-$\lambda$ curve; and calculating the high-altitude power curve with power limit from said first power curve, thereby using a site air density.

According to a further aspect of the present invention, a method of controlling the operation of a wind turbine is provided. The method according to the further aspect of the invention includes the steps of, in an upper partial load range of said wind turbine, using a control strategy based on a corrected power curve which has been obtained by determining a $c_p$-$\lambda$ curve for a predetermined blade pitch angle of said wind turbine; calculating a first power curve without power limit based on the $c_p$-$\lambda$ curve; and calculating the corrected power curve with power limit from said first power curve, thereby using a site air density.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIG. 1 shows a flow diagram of a method according to a first embodiment of the present invention.

FIG. 2 shows a flow diagram of a method according to a further embodiment of the present invention.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 4:
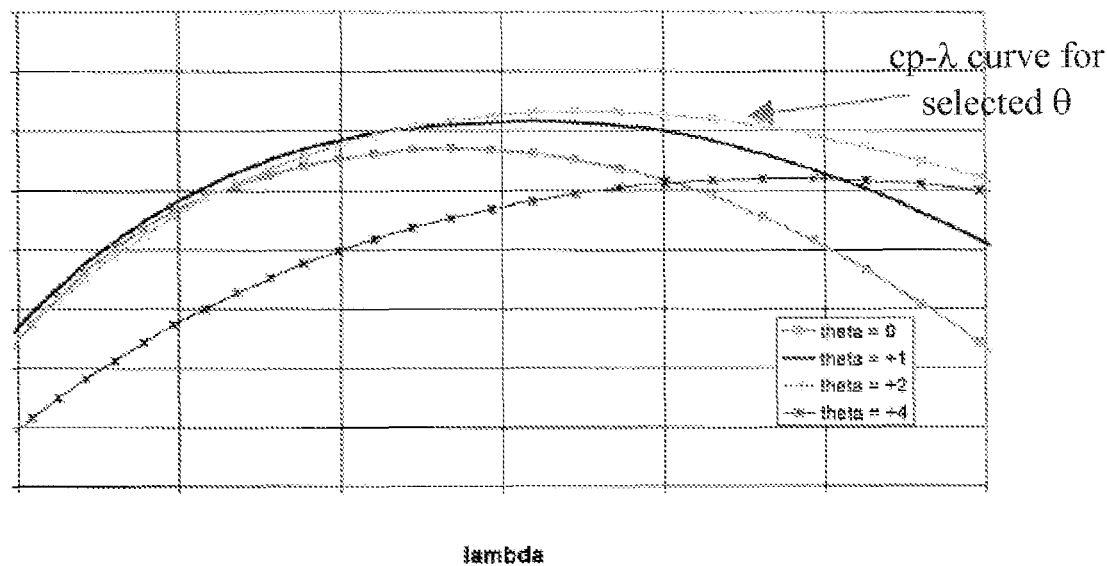
FIG. 4 shows $c_p$-$\lambda$ curves as they are used in the embodiments of the present invention.

FIG. 1 shows a flow diagram of a method according to a first embodiment of the present invention. Therein, in a first step 101 a relation between the power coefficient $c_p$ and the tip-speed ratio $\lambda$ is determined. This relation is typically called a $c_p$-$\lambda$ curve and is widely used for the characterization of wind turbines. In particular, the $c_p$-$\lambda$ curve will depend on the shape and number of the rotor blades as well as on the actual pitch angle of the blades. FIG. 4 shows several examples of $c_p$-$\lambda$ curves for different values of the pitch angle $\theta$. First of all, it can be seen that the power coefficient $c_p$ varies with tip speed ratio $\lambda$ and has a well-defined maximum value. It can be seen from FIG. 4 that the position and height of the maximum $c_p$ changes substantially with pitch angle $\theta$.

Figure 5:
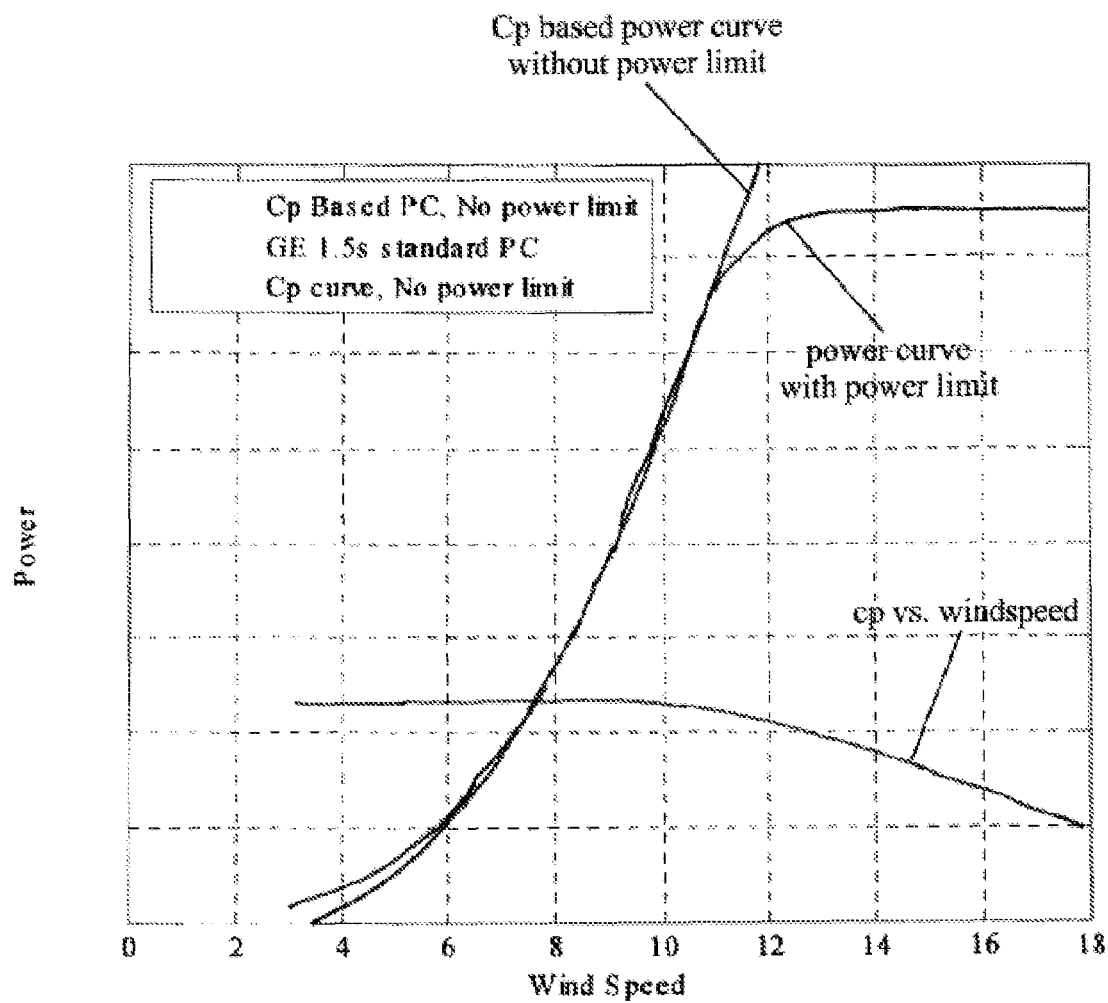
FIG. 5 shows power curves with and without power limit as they are used in embodiments of the present invention.

Returning to FIG. 1, the relation between power coefficient $c_p$ and tip-speed ratio $\lambda$ is used to determine a relation between the electrical power output P and wind speed v. This relation between power output and wind speed is also called the power curve of the turbine and is well-known to those skilled in the art. An example of a power curve is shown in FIG. 5. Therein, the curve labeled "power curve with power limit" is a standard power curve for a pitch regulated wind turbine. It can be seen that the maximum power output is constant independent of the wind speed. This is the so-called full load region of operation at wind speeds of about 13 m/s or more where the wind turbine constantly generates its maximum output power. At lower wind speeds in the range from about 4 m/s to about 13 m/s, the wind turbine is in the so-called partial load region. As can be seen from FIG. 5, the power production in the partial load region is not constant and varies depending on wind speed. In the method according to the embodiment shown in FIG. 1, the power curve is determined in step 102 using on the $c_p$-$\lambda$ curve determined in previous step 101. Thus, the variation of power coefficient $c_p$ with tip speed ratio $\lambda$ (FIG. 4) is taken into account when determining the power curve. Accordingly, the power curve determined by the above-described method is more exact than a power curve which does not take the variation of power coefficient $c_p$ into account.

In this context, it should be understood that the normalization method according to the IEC 61400-12 standard assumes that the power coefficient is constant, i.e. independent of wind speed and air density as will be explained in the following. The mechanical power P captured from the wind is given by $$P = \frac{1}{2} c_p \rho v^3 \pi R^2$$

wherein $\rho$ is air density, v is wind speed and R is rotor radius. The normalization is applied to the wind speed according to the equation $$v_n = v_{10min} \left[ \frac{\rho_{10min}}{\rho_0} \right]^{1/3}$$

wherein $v_n$ is normalized wind speed, $\rho_0$ is reference air density (sea level), $v_{10min}$ is measured wind speed averaged over 10 minutes, and $\rho_{10min}$ is measured air density averaged over 10 minutes. From the above formulae and the assumption that the normalized power is equal to the measured power ($P_n = P_{10min}$), it can be derived that the IEC normalization assumes that the power coefficient $c_p$ is not a function of wind speed and air density. However, it can be seen from FIG. 4 that this assumption does not agree with the real operating conditions of the wind turbine.

Figure 6:
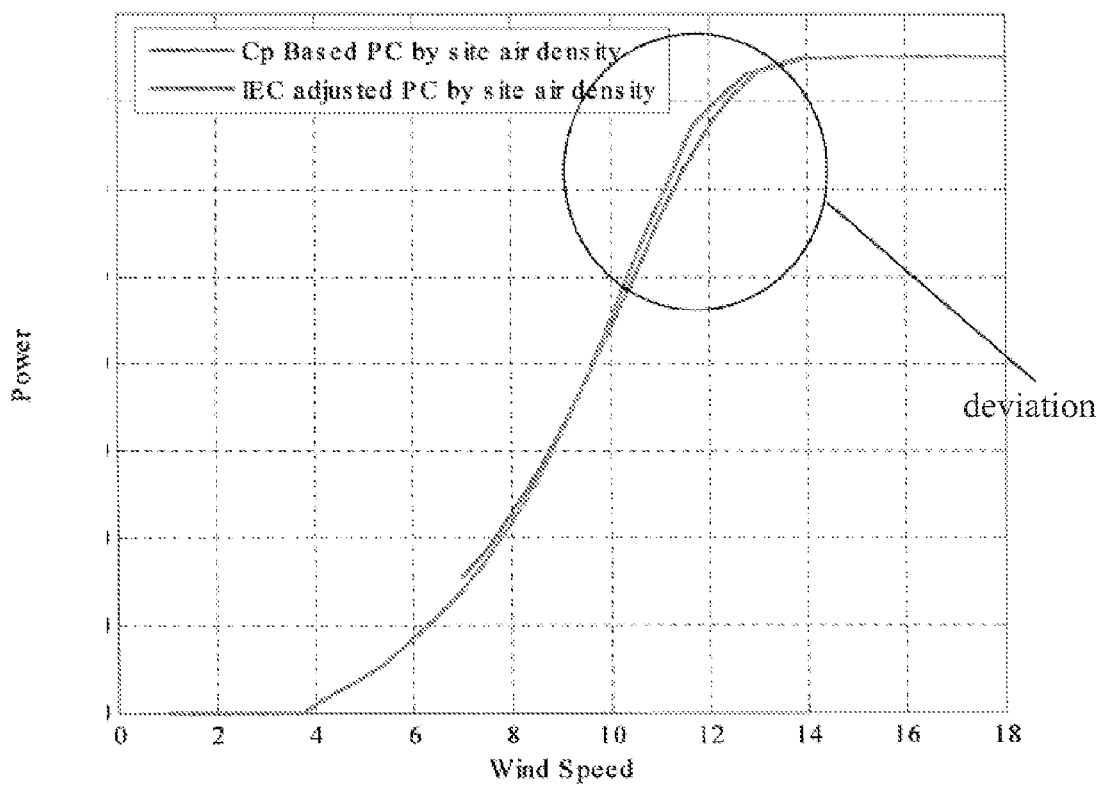
FIG. 6 shows a comparison of a power curve obtained by a method according to an embodiment of the present invention and a power curve obtained by a standard high-altitude correction procedure.
Figure 7:
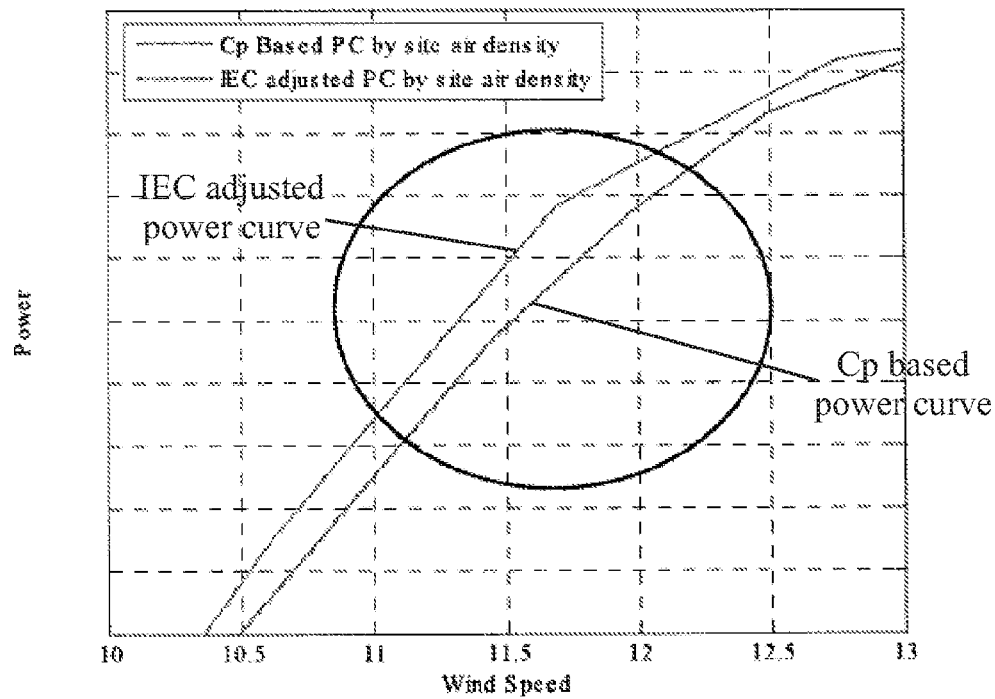
FIG. 7 shows an enlarged view of a deviation in FIG. 6.
Figure 8:
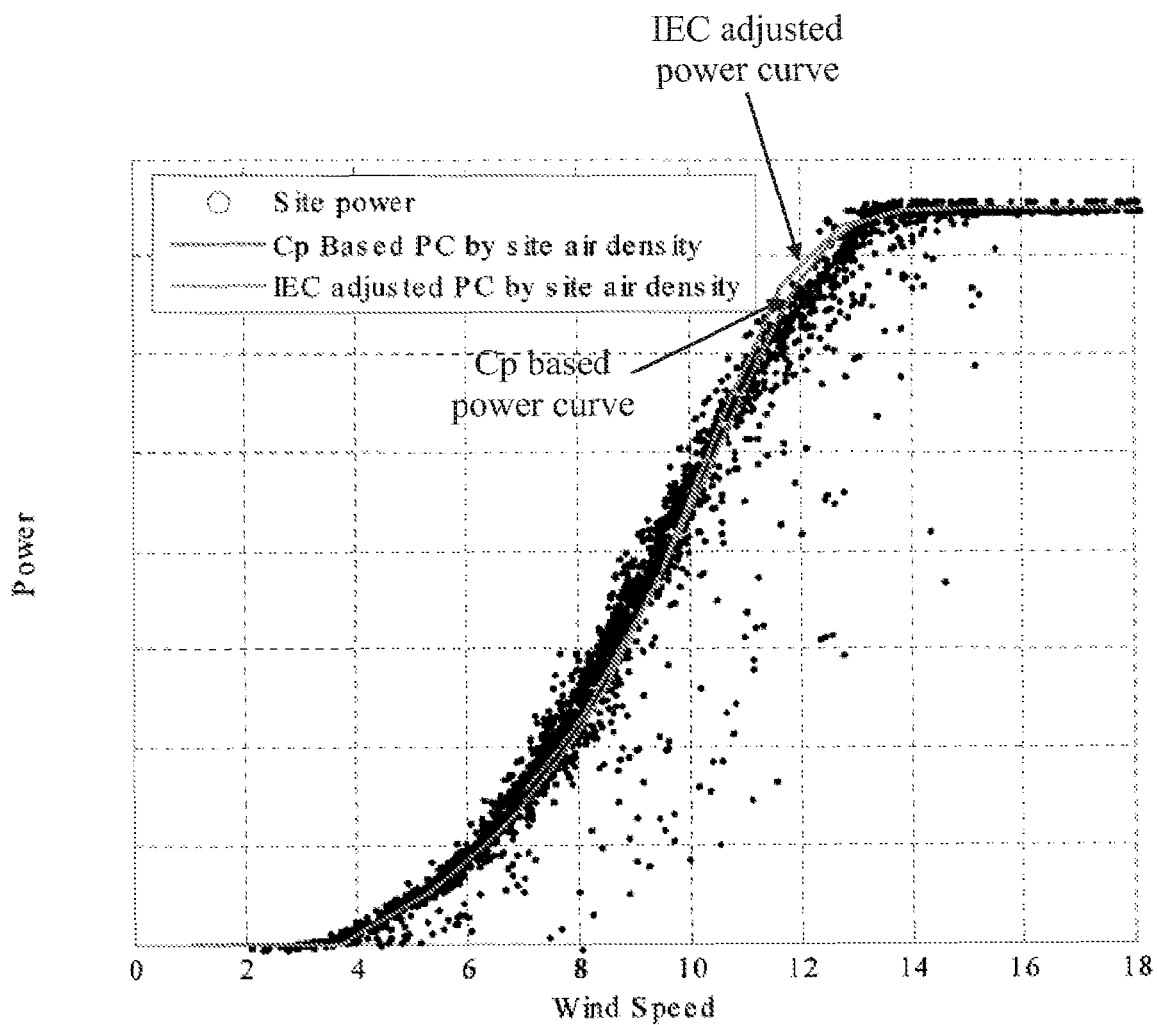
FIG. 8 shows a comparison of a power curve obtained by a method according to an embodiment of the present invention and a power curve obtained by a standard procedure to measured power output values.
Figure 9:
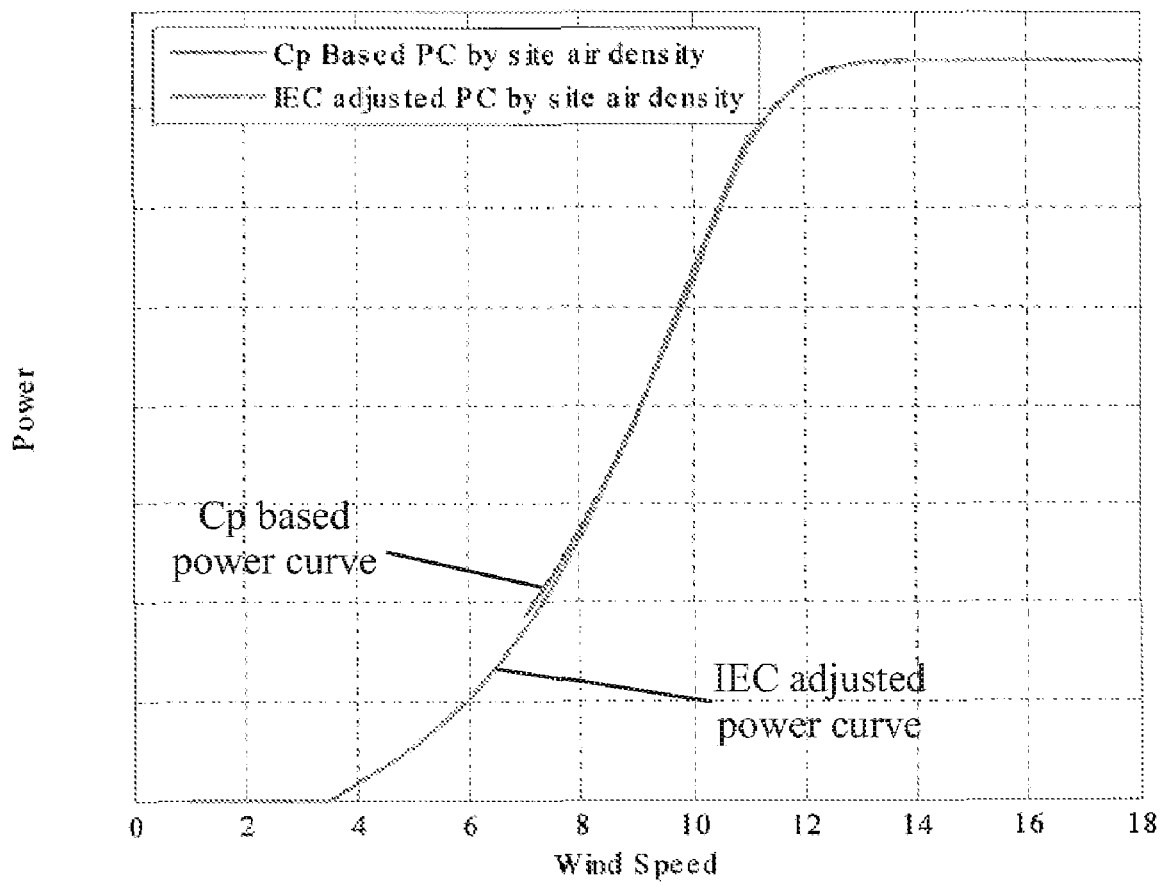
FIG. 9 shows a comparison of a power curve obtained by a method according to an embodiment of the present invention and a power curve obtained by a standard procedure for sea level air density.

Since the power curve obtained by a method according to an embodiment of the present invention takes the variation of $c_p$ with tip speed $\lambda$ into account, the power curve according to the present invention reflects the actual power production of the wind turbine more accurately compared to the power curve obtained by the IEC normalization method. This is shown in FIGS. 6 and 7, where a $c_p$-based power curve and an IEC adjusted power curve for high altitude conditions are plotted together. It can be seen that there exists a considerable deviation between the two power curves in an upper partial load range from about 10 m/s to about 13 m/s. This region is shown in an enlarged view in FIG. 7. Therefrom, one can see that the IEC adjusted power curve overrates the output power in the upper partial load range compared to the $c_p$-based power curve. A comparison of the IEC adjusted power curve and the $c_p$-based power curve with measured power values at a high altitude site is shown in FIG. 8. Therein, it can be seen that the $c_p$-based power curve fits the measured values much better in the upper partial load range than the IEC adjusted curve. Therefore, the power curve obtained by a method according to an embodiment of the present invention is better adapted to the actual power production of the turbines than the IEC adjusted power curve. This improvement is especially relevant for high altitude sites as shown in FIGS. 6, 7, and 8. In other words, the $c_p$-based power curve is adapted for low air density sites, i.e. high altitude and low air density may be used synonymously. FIG. 9 shows a comparison of a $c_p$-based power curve obtained by a method according to an embodiment of the present invention and an IEC adjusted power curve, wherein the results are obtained for sea level. As can be seen, the power curves are substantially identical, i.e. both methods lead to almost identical results at sea level.

FIG. 2 shows a flow diagram of a method according to a further embodiment of the present invention. Therein, a fixed pitch angle $\theta$ is determined in a first step 201. In the present embodiment, a pitch angle of $\theta = 2°$ is chosen as an optimum pitch angle, but also another suitable pitch angle may be selected. In the next step 202, the $c_p$-$\lambda$ curve for the pitch angle of $\theta = 2°$ is determined. As it is shown in FIG. 4, the shape of the $c_p$-$\lambda$ curve depends on the pitch angle $\theta$ and the $c_p$-$\lambda$ curve for $\theta = 2°$ is optimal in that it has the maximum $c_p$ of all $c_p$-$\lambda$ curves for the different pitch values shown in FIG. 4. In the next step 203, a power curve is calculated taking into account the $c_p$ variation. This can be either done directly or by first converting the $c_p$-$\lambda$ curve into a $c_p$-v curve, i.e. by first determining the relation between power coefficient and wind speed from the $c_p$-$\lambda$ curve. A typical $c_p$-v curve is shown in FIG. 5 from which is apparent that $c_p$ is more or less constant in a lower partial load range but decreases within an upper partial load range, i.e. above about 8 m/s. As mentioned above, in step 203 a power curve without power limit is calculated. Such a power curve without limit is also shown in FIG. 5. Of course, the actual power curve will have such a limit. Therefore, a power curve having a power limit is calculated from the intermediate unlimited power curve in final step 204. Also, in this final step the air density at the wind turbine site is taken into account. Typically, the present method is applied to calculate power curves for turbine at high altitude sites. At those sites, the local air density typically is only 80% to 95%, more typically 80% to 90% of the air density at sea level. In the present example, a power curve for a high altitude site having an air density as low as 1.02 kg/m³ (compared to 1.225 kg/m³ at sea level) is calculated. As a result, a power curve is obtained that is suitably fitted to the actual output power of the wind turbine. In particular, the power curve obtained by the above method fits the actual output power better than an IEC adjusted power curve as is shown in FIG. 8.

Figure 3:
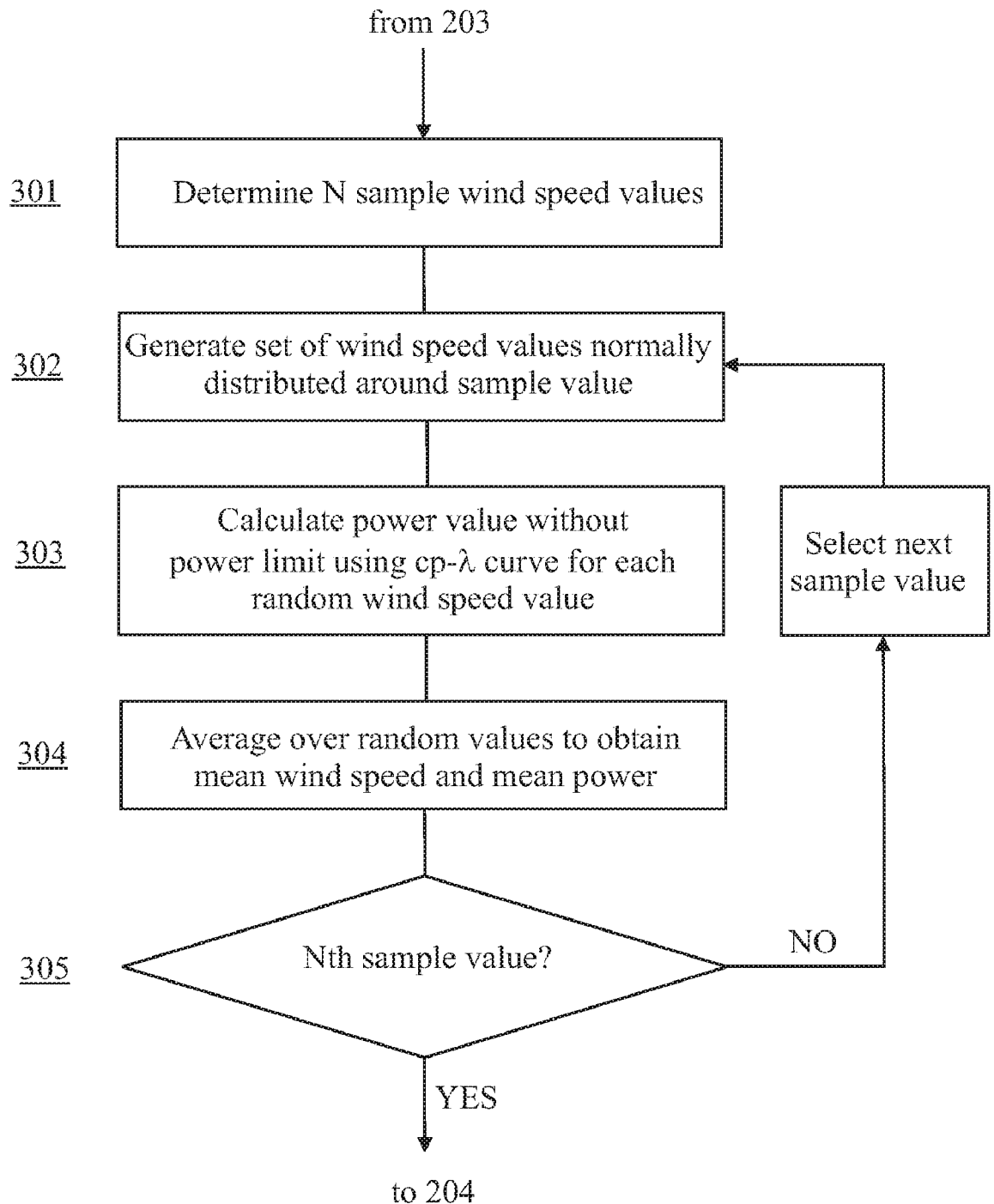
FIG. 3 shows a flow diagram of a method according to another embodiment of the present invention.

FIG. 3 shows a flow diagram of a method according to another embodiment of the present invention. Therein, it is described how the calculated power curve can be smoothed and atmospheric turbulence can be taken into account. In order to calculate the power curve using the $c_p$-λ curve, first N sample wind speed values, N>1, are determined in step 301. For example, the power curve is to be calculated in the wind speed range between 7 m/s and 16 m/s. The N sample wind speed values may then be determined by dividing the wind speed range into N−1 regular intervals. Of course, the sample values may also be determined by any other suitable method. Next, a first sample value is selected and a set of M randomly distributed wind speed values is generated in step 302. Typically, the wind speed values are distributed according to a normal distribution centered about the sample value. However, other distributions may be chosen if they are believed to resemble the wind speed variations more closely. In the next step 303, the corresponding output power value is calculated for each of the randomly distributed wind speed values, thereby using the $c_p$-λ curve as described above. In the next step 304, the wind speeds and the power values are averaged to obtain a mean wind speed value and a mean output power value. This procedure is repeated for any of the N sample wind speed values so that the power curve is smoothed by the averaged values. After the averaged output power and wind speed values have been obtained, the method continues with the calculation of the power curve with power limit in step 204.

Figure 10:
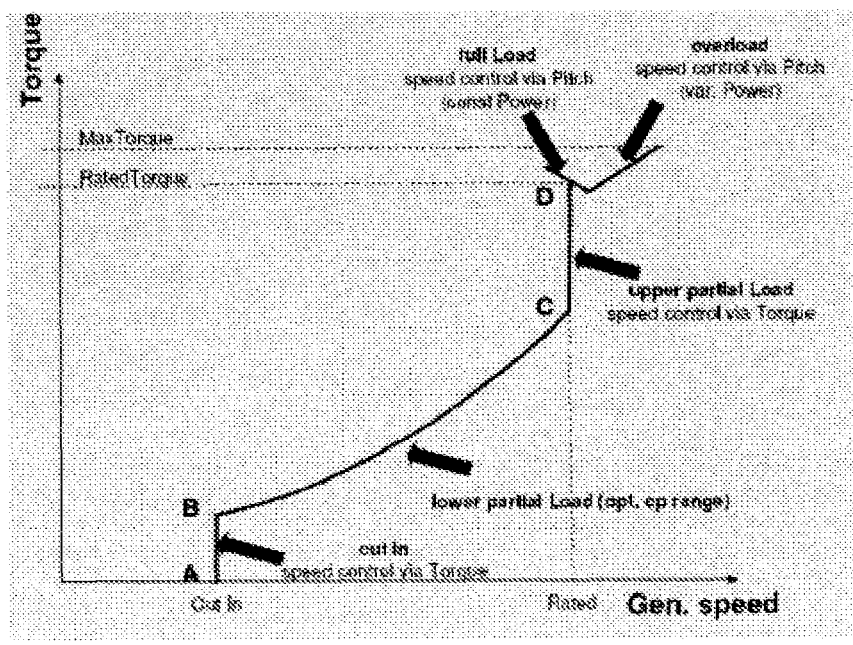
FIG. 10 shows a control scheme for a wind turbine according to an embodiment of the present invention.

Next, it is described how the power curves obtained according to an embodiment of the present invention may be utilized in the control strategy of a wind turbine. In this respect, reference is made to FIG. 10 which shows a control scheme for a wind turbine according to an embodiment of the present invention. Therein, generator torque vs. generator speed is shown and different control stages are marked by literals A to D. In the cut-in stage A-B, the wind speed attains the minimum level for turbine operation and the turbine cuts in for operation. In the stage A-B, the wind turbine control is limited since the turbine cannot capture maximum energy due to the physical limitation itself. In this stage, generator speed is kept constant and controlled via the torque, i.e. via the electric system of the generator. Between points B and C exists the lower partial load range with typical wind speeds in the range of about 4 m/s to 8 m/s. In this lower partial load range, generator speed increases and the turbine is running with optimum $c_p$ so that maximum energy is captured from the wind. When the generator speed reaches the rated generator speed at point C, the upper partial load range begins, typically in a wind speed range from about 8 m/s up to about 13 m/s. In this upper partial load range, the generator speed is kept constant at the rated generator speed while generator torque increases up to the rated torque. In control stage C-D, the pitch angle θ is fixed and generator speed is controlled via torque as in stage A-B. Above rated torque, full load operation and overload operation of the turbine occurs wherein generator speed is controlled via the blade pitch.

Figure 11:
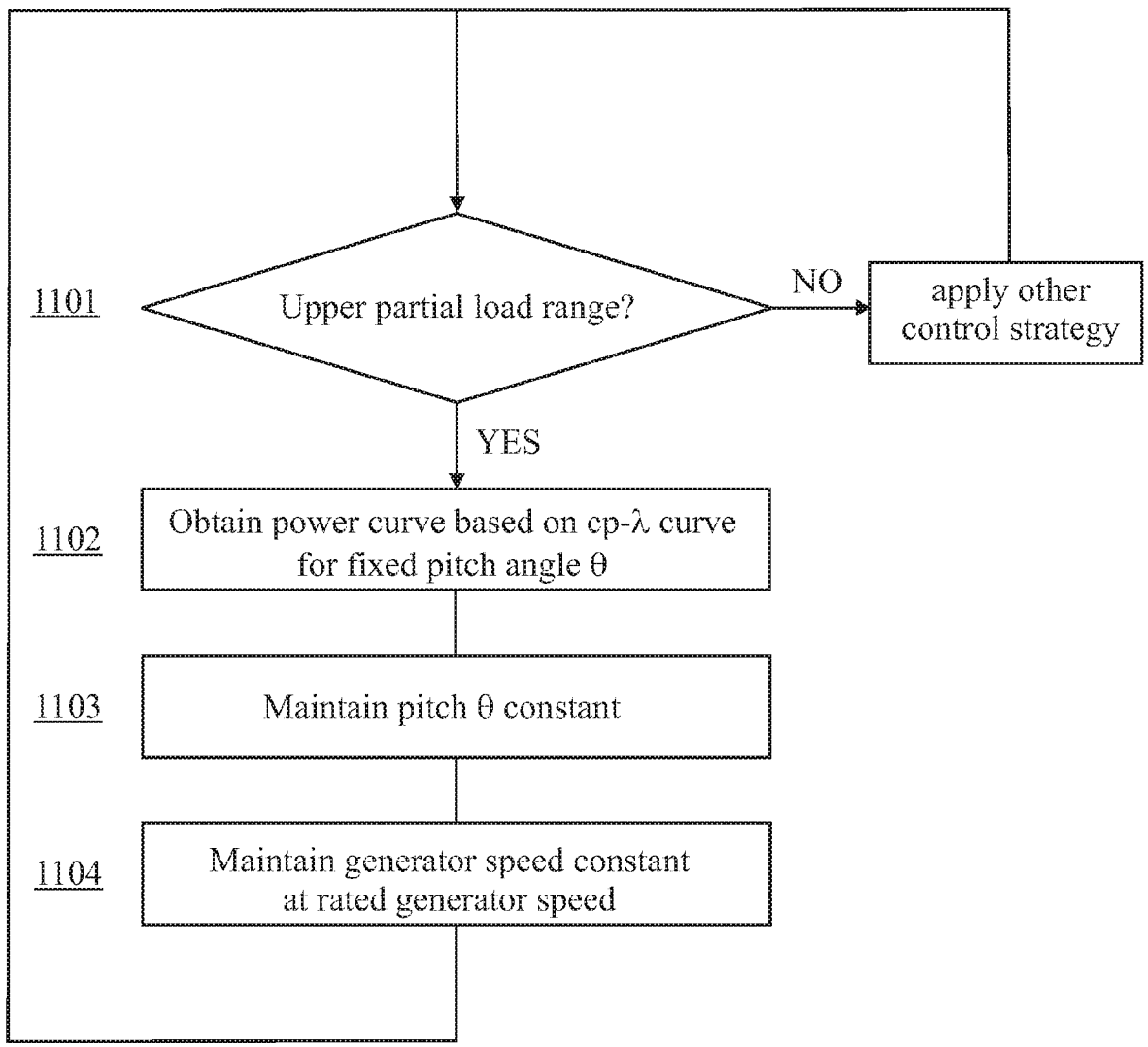
FIG. 11 shows a flow diagram of a control method according to a further embodiment of the present invention.

FIG. 11 shows a flow diagram of a control method according to a further embodiment of the present invention. Therein, it is first determined in step 1101 whether the turbine operates in an upper partial load range, typically in a wind speed range of about 8 m/s to about 13 m/s. If not, a different control strategy, e.g. as described above, is applied. If the turbine operates in the upper partial load range, a power curve based on a $c_p$-λ curve for the predetermined pitch angle θ is obtained. Typically, the pitch angle θ and the power curve will be previously calculated and stored in a memory of the wind turbine controller, e.g. in the form of a list. However, it is also possible to obtain the power curve on demand if the turbine enters the upper partial load range. Next, the pitch angle θ is kept constant, e.g. at 2°, in step 1103. Also, the generator speed is kept constant, typically at the rated generator speed, in step 1104. Typically, this is done by controlling generator speed via generator torque. Since the above-described control strategy uses the $c_p$-based power curve for generator control, it is better adapted than a control strategy based on an IEC adjusted power curve.

Finally, the present invention includes a wind turbine having a wind turbine controlled in which a control strategy according to an embodiment of the present invention is implemented. In particular, a $c_p$-based power curve may be stored in the turbine controller, e.g. as a functional relationship or a list. Since the $c_p$-based power curve is well adapted to the actual power output, especially at high altitude sites, the turbine controller is improved compared to turbine controllers using an IEC adjusted power curve.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A method for obtaining a power curve for a wind turbine, comprising the steps of:
   (a) determining a relation between the power coefficient $c_p$ and the tip-speed ratio λ for said wind turbine;
   (b) using the relation between power coefficient $c_p$ and the tip-speed ratio λ to determine a relation between the electrical power output P and wind speed v to obtain the power curve.

2. The method according to claim 1, wherein a relation between the power coefficient $c_p$ and the tip-speed ratio λ is determined for a predetermined pitch angle.

3. The method according to claim 1, wherein in step (b)
   (b1) an intermediate power curve without power limit is calculated based on the $c_p$-λ curve determined in step (a), and then
   (b2) a final power curve with power limit is calculated using the air density of the wind turbine site.

4. The method according to claim 3, wherein in step (b1) a set of randomly distributed wind speed values is generated, a power output value is derived for each of the wind speed values in the set, and a mean power output value and a mean wind speed value are determined.

5. The method according to claim 4, wherein the randomly distributed wind speed values are distributed according to a normal distribution around at least one predetermined wind speed value.

6. The method according to claim 3, wherein the site air density is about 80% to 90% of the air density at sea level.

7. The method according to claim 1, wherein a relation between power coefficient $c_p$ and the wind speed v is determined from the relation between power coefficient $c_p$ and the tip-speed ratio $\lambda$ in step (b).

8. The method according to claim 1, wherein the method is used to correct a predetermined power curve for sea level operation for high altitude operation of the wind turbine.

9. The method according to claim 1, wherein the power curve is obtained for wind speeds in the range from 7 m/s to 16 m/s.

10. The method according to claim 9, wherein the power curve is obtained for wind speeds in the range from 9 m/s to 13 m/s.

11. A method for calculating a high-altitude power curve for a wind turbine, comprising the steps of:
   determining a $c_p$-$\lambda$ curve for a predetermined blade pitch angle of said wind turbine;
   calculating a first power curve without power limit based on the $c_p$-$\lambda$ curve; and
   calculating the high-altitude power curve with power limit from said first power curve, thereby using a site air density.

12. The method according to claim 11, the calculation of the first power curve further comprises the steps of
   generating a set of randomly distributed wind speed values, which are normally distributed around a predetermined wind speed value;
   calculating an output power value without power limit based on the $c_p$-$\lambda$, curve for each of the wind speed values in the set of randomly distributed wind speed values, thus generating a set of randomly distributed output power values;
   calculating a mean output power value and mean wind speed value from the sets of randomly distributed output power values and randomly distributed wind speed values.

13. The method according to claim 11, wherein the high-altitude power curve is determined for wind speeds in the range from 7 m/s to 16 m/s.

14. The method according to claim 11, wherein a relation between the power coefficient $c_p$ and wind speed v is determined from the $c_p$-$\lambda$ curve to calculate the first power curve.

15. A method of controlling the operation of a wind turbine, comprising the steps of:
   in an upper partial load range of said wind turbine, using a control strategy based on a corrected power curve which has been obtained by
      determining a $c_p$-$\lambda$ curve for a predetermined blade pitch angle of said wind turbine;
      calculating a first power curve without power limit based on the $c_p$-$\lambda$ curve; and
      calculating the corrected power curve with power limit from said first power curve, thereby using a site air density.

16. The control method according to claim 15, wherein a blade pitch of said wind turbine is maintained constant at said predetermined blade pitch angle value.

17. The control method according to claim 15, wherein a generator speed of said wind turbine is maintained constant at a rated generator speed.

18. The control method according to claim 17, wherein the generator speed is kept constant by controlling generator torque.

19. The control method according to claim 15, wherein the method is applied during wind speeds in the range from about 8 m/s to about 13 m/s.

20. A wind turbine, comprising
   a controller having implemented a control strategy according to claim 15.

* * * * *